United States Patent
Fuhse

(10) Patent No.: US 10,029,506 B2
(45) Date of Patent: Jul. 24, 2018

(54) OPTICALLY VARIABLE AREAL PATTERN

(71) Applicant: GIESECKE & DEVRIENT GMBH, Munich (DE)

(72) Inventor: Christian Fuhse, Otterfing (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 0 days.

(21) Appl. No.: 14/435,534

(22) PCT Filed: Oct. 14, 2013

(86) PCT No.: PCT/EP2013/003088
§ 371 (c)(1),
(2) Date: Apr. 14, 2015

(87) PCT Pub. No.: WO2014/060089
PCT Pub. Date: Apr. 24, 2014

(65) Prior Publication Data
US 2015/0258838 A1    Sep. 17, 2015

(30) Foreign Application Priority Data

Oct. 16, 2012 (DE) .......... 10 2012 020 257

(51) Int. Cl.
*B42D 25/324* (2014.01)
*B42D 25/00* (2014.01)
(Continued)

(52) U.S. Cl.
CPC .......... *B42D 25/328* (2014.10); *B42D 25/00* (2014.10); *B42D 25/29* (2014.10); *B42D 25/324* (2014.10);
(Continued)

(58) Field of Classification Search
CPC .................................... B42D 25/324
See application file for complete search history.

(56) References Cited

U.S. PATENT DOCUMENTS 7,551,335 B2    6/2009 Schilling et al.
2005/0068624 A1*  3/2005 Schilling ............ B42D 25/29
                                                       359/566
(Continued)

FOREIGN PATENT DOCUMENTS

DE    102010025775 A1    1/2012
DE    102010048262 A1 *  4/2012 .......... B42D 25/425
(Continued)

OTHER PUBLICATIONS

German Search Report for corresponding German Application No. 102012020257.1, dated Nov. 8, 2012.
(Continued)

*Primary Examiner* — Kyle R Grabowski
(74) *Attorney, Agent, or Firm* — Workman Nydegger

(57) ABSTRACT

The present invention relates to an optically variable surface pattern having a substrate that comprises a first and a second surface region, the two surface regions being developed in such a way that the first surface region presents, in a first viewing angle range ($\alpha 1$) a bulged-appearing first depiction, and the second surface region presents, in a second viewing angle range ($\alpha 2$) that is different from the first viewing angle range ($\alpha 1$), a bulged-appearing second depiction.

12 Claims, 5 Drawing Sheets

(51) Int. Cl.

| | | |
|---|---|---|
| *B42D 25/328* | (2014.01) | |
| *B44F 7/00* | (2006.01) | |
| *G02B 5/09* | (2006.01) | |
| *G02B 5/18* | (2006.01) | |
| *G02B 5/32* | (2006.01) | |
| *G03H 1/00* | (2006.01) | |
| *B42D 25/29* | (2014.01) | |
| *B42D 25/40* | (2014.01) | |
| *G07D 7/00* | (2016.01) | |
| *G07D 7/207* | (2016.01) | |
| *G03H 1/02* | (2006.01) | |

(52) U.S. Cl.
 CPC ............... *B42D 25/40* (2014.10); *B44F 7/00* (2013.01); *G02B 5/09* (2013.01); *G02B 5/1842* (2013.01); *G02B 5/1861* (2013.01); *G02B 5/32* (2013.01); *G03H 1/0011* (2013.01); *G07D 7/003* (2017.05); *G07D 7/207* (2017.05); *G03H 1/0248* (2013.01); *Y10T 29/49* (2015.01)

(56) References Cited

U.S. PATENT DOCUMENTS

| | | | |
|---|---|---|---|
| 2006/0056065 A1 | 3/2006 | Shcilling et al. | |
| 2009/0162756 A1* | 6/2009 | Staub | B42D 25/328 |
| | | | 430/2 |
| 2013/0093172 A1 | 4/2013 | Fuhse et al. | |
| 2013/0093178 A1* | 4/2013 | Shanley | B42D 15/00 |
| | | | 283/81 |
| 2013/0099474 A1 | 4/2013 | Fuhse et al. | |

FOREIGN PATENT DOCUMENTS

| | | | | |
|---|---|---|---|---|
| DE | 102010049617 A1 | | 4/2012 | |
| DE | 102010055688 A1 | | 6/2012 | |
| EP | 0919961 A2 | | 6/1999 | |
| EP | 1562758 A1 | | 8/2005 | |
| FR | 2959830 A1 | * | 11/2011 | ........... B42D 25/324 |
| JP | 2002131697 A | | 5/2002 | |
| JP | 2008292665 A | | 12/2008 | |
| WO | WO 9008338 A1 | * | 7/1990 | ............. G09F 19/12 |
| WO | WO 2007079851 A1 | * | 7/2007 | ............. B42D 25/29 |
| WO | WO 2010100360 A1 | * | 9/2010 | ............. B42D 25/29 |
| WO | 2011066990 A2 | | 6/2011 | |
| WO | WO 2011066990 A3 | * | 7/2011 | ............. B42D 15/00 |

OTHER PUBLICATIONS

International Search Report for corresponding International PCT Application No. PCT/EP2013/003088, dated Apr. 14, 2014.

* cited by examiner

OPTICALLY VARIABLE AREAL PATTERN

BACKGROUND

The present invention relates to an optically variable areal pattern that can be provided, for example, in objects to be protected, such that the optically variable areal pattern permits the authenticity of the object to be verified, and/or serves as protection against unauthorized reproduction or imitation.

Optically variable areal patterns are known that mimic to a viewer, by means of microscopically small embossing patterns, the impression of a macroscopically bulged surface. A simple example is a metalized Fresnel lens that a viewer can perceive as a spherical surface. Further examples of more complex motifs are described, for example, in EP 1 562 758 B1.

From WO 2011/066990 A2 it is known to reconstruct a bulge having a plurality of small, reflective facets. Such areal patterns are well suited as security elements, since the optical effect is easy to understand and is easily visible also in poor lighting conditions, and since a reproduction with typographic means is not possible.

Due to the high attractiveness of the optical effects, they are used not only within the banknote field but, for example, also increasingly in the packaging industry. This is causing the special status of such effects as a security feature to dwindle, and the threat due to reproductions or imitations to rise.

SUMMARY

Proceeding from this, it is the object of the present invention to provide an optically variable areal pattern that sets itself clearly visibly apart from known optically variable areal patterns in order, in this way, to guarantee, also in the future, a high level of protection against reproductions or imitations, whereby the effect provided by the optically variable areal pattern should be such that it can be easily perceived and verified by a viewer for authenticity verification.

The object is solved by an optically variable areal pattern that comprises a substrate having a first and a second areal region, the two areal regions being developed in such a way that the first areal region presents, in a first solid angle range, a bulged-appearing first view, and the second areal region presents, in a second solid angle range that is different from the first solid angle range, a bulged-appearing second view (that preferably is different from the first view).

In this way, a viewer can perceive, by tilting the optically variable areal pattern, first the first view and, thereafter, the second view. Even if the two solid angle ranges partially overlap, upon tilting, there are viewing situations in which either only the first view or only the second view is perceptible. Said effect is easy for a viewer to understand and to verify.

In particular, at least one of the areal regions is developed as a reflective areal region. In this way, the viewer can be presented a reflection behavior that corresponds to the reflection behavior of a reflective surface that is actually bulged, which is surprising and very memorable.

Thus, in the optically variable areal pattern according to the present invention, at least one of the two areal regions can present the bulged-appearing view by imitating the reflection behavior of a correspondingly bulged surface.

The solid angle ranges can be of equal size. However, it is also possible that they are of different sizes.

In particular, the imitation of the reflection behavior of the bulged surface can be effected by optically effective relief patterns.

The optically effective relief patterns can be developed in a lacquer layer. In particular, they can be cast in an embossing lacquer.

The optically effective relief patterns can be provided with a reflective or at least reflection-increasing coating. In particular, a metallic or high-index coating can be provided.

A reflection-increasing coating within the meaning of the present invention is especially a coating that increases the reflection factor, for example, from about 20% to about 50%, such as semitransparent layers. The reflection-increasing coating can be a metallic coating that, for example, is vapor deposited. Especially aluminum, gold, silver, copper, palladium, chrome, nickel and/or tungsten and their alloys can be used as the coating material.

In the optically variable areal pattern according to the present invention, the optically effective relief patterns can comprise micromirrors. The micromirrors are preferably substantially ray-optically effective and can be arranged regularly and/or irregularly.

The micromirrors can have dimensions between 2 μm and 300 μm, preferably between 3 μm and 100 μm, and particularly preferably between 6 μm and 20 μm.

Further, the relief patterns can comprise diffraction-optically-acting diffraction patterns. Said diffraction patterns can especially be substantially diffraction-optically effective. Further, the diffraction patterns can be developed symmetrically or preferably asymmetrically.

In the optically variable areal pattern according to the present invention, for each view, the relief patterns can each reconstruct local changes in the slope of the respective view to be presented. Here, the reproduced local changes in slope preferably have slope values that differ from the corresponding local slope values of the reproduced bulged view.

In particular, the local changes in slope reproduced by the relief patterns can be chosen such that incident parallel light is reflected in the corresponding solid angle range (for example the first or second solid angle range). Since human perception is apparently geared toward perceiving changes in slope corresponding to a curvature or bulge, while the absolute slope is very difficult to perceive, for a viewer, the bulged-appearing views are perceptible as such in the different solid angle ranges.

One can also say that a height function of the corresponding bulged view is reproduced with the relief patterns. To characterize the bulged view, the height function is commonly dependent on two spatial coordinates in a plane. A local slope can be determined depending on the height function. The local slope is then changed for the different views in such a way that the presentation occurs in the different solid angle ranges. Here, the change in the slope can be executed depending on both spatial coordinates. However, it is also possible to execute the change in the slope with reference to only one spatial coordinate, and to leave the slope unchanged with respect to the other spatial coordinate.

Of course it is also possible to choose the change in the slope to be different for both spatial coordinates.

In the optically variable areal pattern, the areal regions can be nested within each other. In particular, the optically variable areal pattern can comprise more than two different areal regions. It can thus comprise three, four or also more different areal regions that each present differently bulged-appearing views in differing solid angle ranges.

In particular, the two solid angle ranges can not overlap when two areal patterns are provided, or also multiple solid angle ranges when multiple areal patterns are provided.

In the optically variable areal pattern, the first and/or second areal region can reflect incident parallel light in an angle range of at least 10°, preferably at least 20° and particularly preferably at least 30°. In this way, it is achieved that the associated view becomes visible from a corresponding large viewing angle range having a well-perceptible bulge.

Further, an exposed hologram, especially a volume hologram, is provided for whose exposure the inventive optically variable areal pattern (including its developments) is used.

Further, a security element and/or a value document having an inventive optically variable areal pattern (including its developments) is provided.

Furthermore, a method for producing an inventive optically variable areal pattern (including its developments) is provided in which the slope profiles of the bulged views to be presented are determined, the slope profile of the first view and the slope profile of the second view are modified through different transformations, and the substrate having the two areal regions is manufactured based on the modified slope profiles.

It is understood that the above mentioned features and those yet to be explained below are usable not only in the specified combinations, but also in other combinations or alone, without departing from the scope of the present invention.

BRIEF DESCRIPTION OF THE DRAWINGS

By way of example, the present invention will be explained in greater detail below by reference to the attached drawings, which disclose also features that are essential to the invention. To improve clarity, a depiction to scale and proportion was, in some cases, dispensed with in the drawings. Shown are.

DETAILED DESCRIPTION OF VARIOUS EMBODIMENTS

Figure 1:
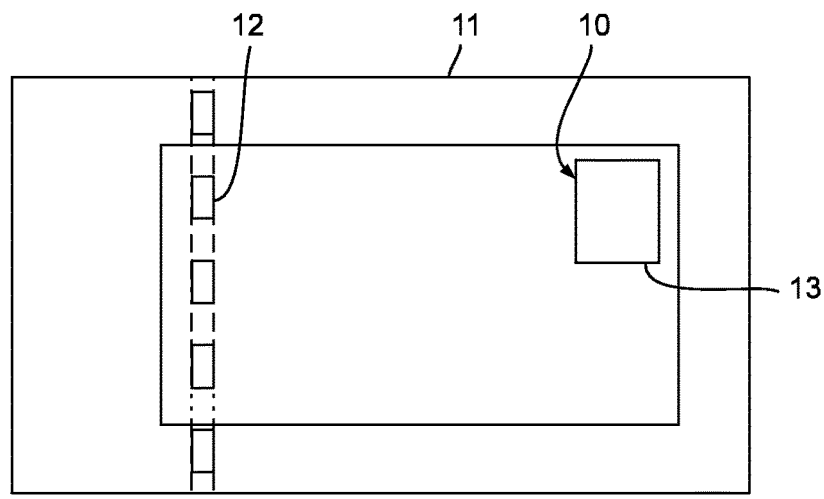
FIG. 1 a top view of a banknote 11 having an optically variable areal pattern 10 according to the present invention.

In the embodiment shown in FIG. 1, the optically variable areal pattern 10 according to the present invention is integrated as a security element in a banknote 11 in such a way that it is visible in the front of the banknote 11 shown in FIG. 1. Alternatively, the optically variable areal pattern 10 according to the present invention can be present, for example, as a window thread 12.

Figure 2:
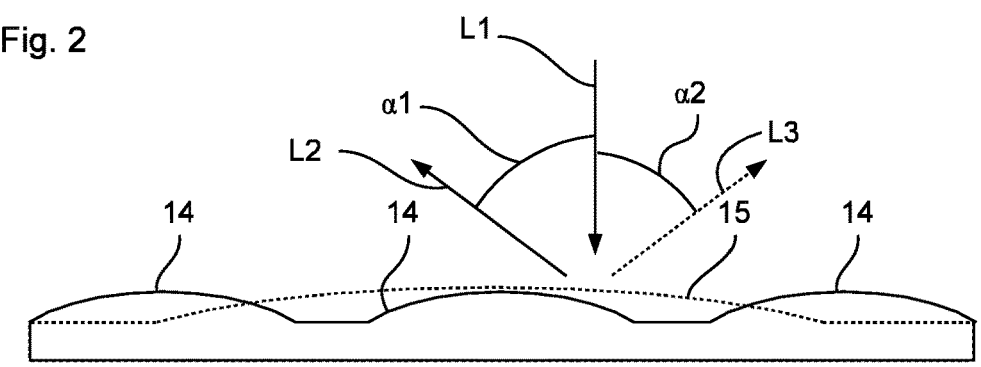
FIG. 2 a sectional view to explain the two views presented in different solid angle ranges.

The optically variable areal pattern 10, which can also be referred to as an optically variable element 10, is developed as a reflective element 10 that presents to a user, in two different solid angle ranges $\alpha 1$, $\alpha 2$, two bulged-appearing views, as indicated in the sectional view in FIG. 2. Thus, the incident light L1 is reflected, on the one hand, in the first solid angle range $\alpha 1$, which extends in the drawing plane from arrow L1 to arrow L2. On the other hand, the incident light L1 is reflected in the second solid angle range $\alpha 2$, which extends in the drawing plane from arrow L1 to arrow L3. In the first solid angle range $\alpha 1$, three small bulged-appearing elevations 14 are presented, as indicated with the solid line in FIG. 2. In the second solid angle range $\alpha 2$, only a single larger elevation 15 is depicted, as indicated by dotted lines.

The bulged-appearing views (the three elevations 14 or the one elevation 15) are realized in that the reflection behavior of such bulged surfaces is imitated. Said imitation can be achieved, for example, in that there are provided, to produce the first view of the three small elevations 14, micromirrors 16, and to produce the second view of the large elevations 15, micromirrors 17, each of which comprise the corresponding local slope to produce the desired bulged-appearing view, as shown in the schematic sectional view in FIG. 3. Here, the micromirrors 16, 17 are arranged in alternation and can be formed, for example, by a patterned lacquer layer 18 whose patterned top is mirrored.

Figure 4:
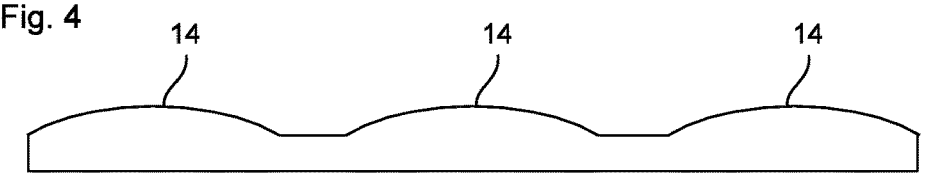
FIG. 4 a sectional view of a surface profile to be reproduced.
Figure 5:
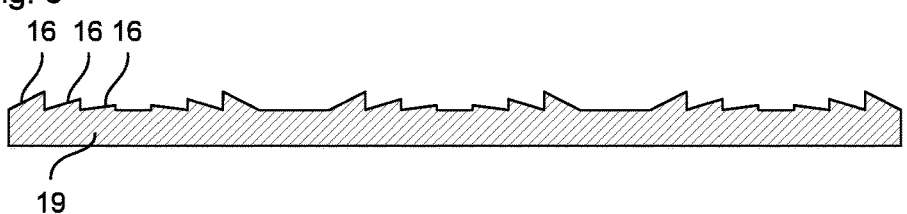
FIG. 5 a sectional view of a corresponding arrangement of the micromirrors 16 for reproducing the surface profile according to FIG. 4.

The production of the bulged-appearing view of the three elevations 14 is explained in greater detail with reference to FIGS. 4 and 5, FIG. 4 showing the surface profile to be reproduced and FIG. 5 the corresponding arrangement of the micromirrors 16. To achieve the desired effect that the flares wander around as on a metallic relief, for example when the areal pattern 10 is tilted, the local slope of the elevations 14 is reproduced by the incline of the micromirrors 16. When the dimension of the micromirrors 16 is sufficiently small (for example smaller than 100 µm), they are no longer resolved separately by the naked human eye, and the entirety of the micromirrors 16 appears to a viewer as a continuous surface. In this first pattern 19 having the micromirrors 16, shown in FIG. 5, the viewer would thus be presented the three elevations 14, which are perceptible with respect to the actual macroscopic spatial form of the first pattern 19 as a protruding, reflective surface.

Figure 6:
FIG. 6 a sectional view of a surface profile to be reproduced.
Figure 7:
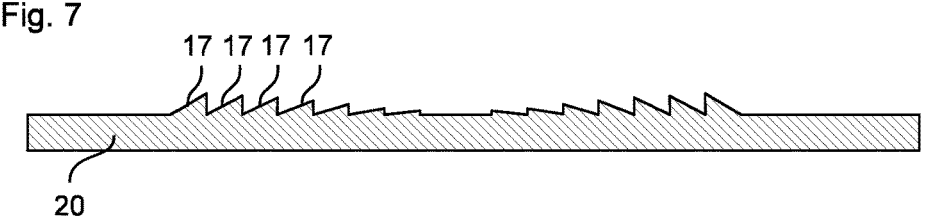
FIG. 7 a sectional view of a corresponding arrangement of the micromirrors 17 for reproducing the surface profile according to FIG. 6.

In the same way, the large elevation 15 according to FIG. 6 can be reproduced by means of a second pattern 20 and the correspondingly arranged micromirrors 17, as is shown in FIG. 7.

Figure 8:
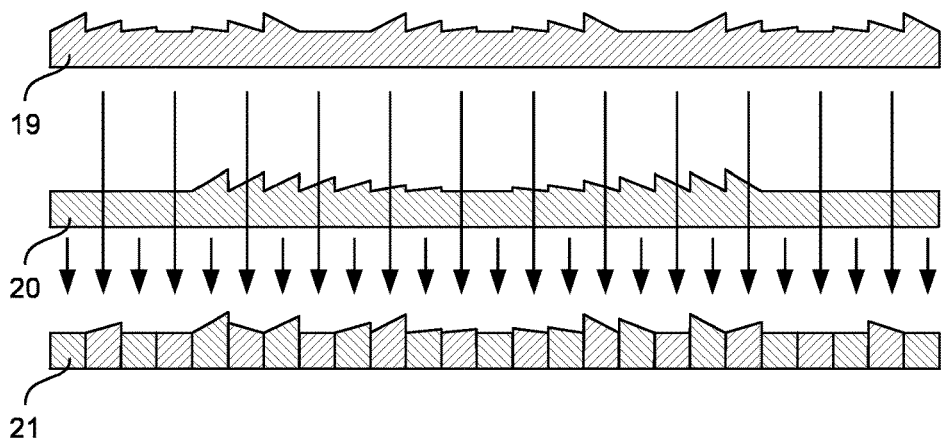
FIG. 8 a diagram of sectional views to explain the nesting of the micromirror arrangements of FIGS. 5 and 7.

Proceeding from the first and second pattern 19 and 20, a third pattern 21 can then be realized in which the micromirrors 16 and 17 are arranged in alternation, as is indicated by the arrows in FIG. 8. The third pattern 21 could then be developed in a lacquer layer. However, this would lead to the three small elevations 14 and the large elevation 15 being perceptible for a viewer simultaneously in the same viewing direction, such that a semitransparent impression is present. For a viewer, a metallic impression would then not be present but, for example, an impression as if the elevations consisted of glass. The elevations 14 and 15 thus appear to a viewer from practically all viewing directions simultaneously, and the entire optically variable areal pattern thus does appear bulged, but also static and unchanging.

Therefore, according to the present invention, the slope of the micromirrors 16 and 17 in the nested pattern 21 is changed in such a way that incident light L1 from micromirrors 16, 17 belonging to different views is reflected in different solid angle ranges $\alpha 1$, $\alpha 2$.

Figure 9:
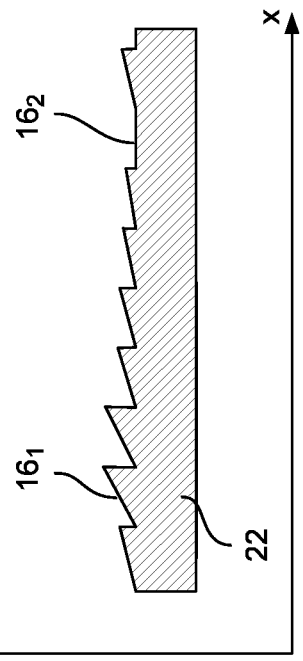
FIG. 9 a magnified sectional view of a portion of the micromirror arrangement according to FIG. 5.
Figure 10:
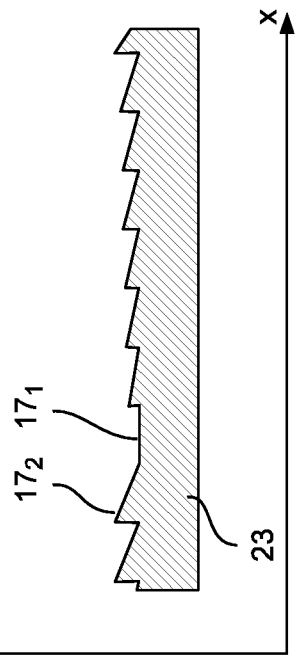
FIG. 10 a magnified sectional view of a portion of the micromirror arrangement according to FIG. 7.
Figure 11:
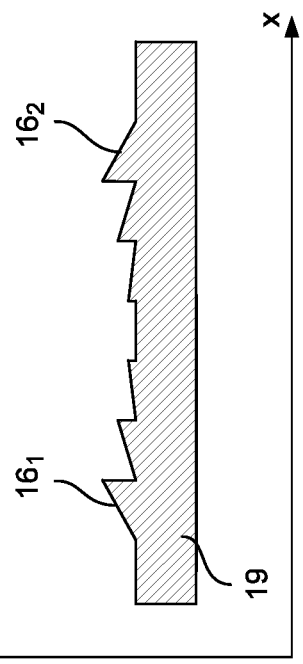
FIG. 11 a sectional view of the micromirror arrangement in FIG. 9 adjusted according to the present invention.

The bulged-appearing depictions (the three small elevations 14 and the large elevation 15) can each be characterized separately by a height function h, the height h=h (x, y) commonly being dependent on two spatial coordinates x and y in a plane. For simpler illustration, in the following, only the spatial coordinate x is considered, which corresponds to the sectional views shown in FIGS. 3, 5, 7 and 8. In FIG. 9 is shown schematically a sectional view of a portion of the first pattern 19 having the micromirrors 16. The local slope S=dh/dx of the first pattern 19 was formed such that it corresponds to the slope of the reproduced small elevations 14 having height h(x). The same applies to the second pattern 20, of which a portion is shown in FIG. 10. Here, too, the local slope S corresponds to the slope of the reproduced large elevation 15 having height h(x). In the exemplary embodiment described here, the slope S of the first and second pattern 19 and 20 is always between −0.5 and 0.5. The split of the reflection directions can now be realized, for example, in that, for the first view, and thus for the first pattern 19, a slope S1 according to S1=0.25+S/2, and for the second view, and thus for the second pattern 20, a slope S2 according to S2=−0.25+S/2 are assigned. The resulting modified first pattern 22 (for the small elevations 14) is depicted in FIG. 11.

Figure 12:
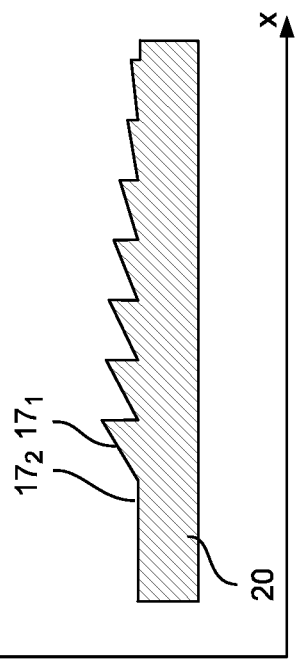
FIG. 12 a sectional view of the micromirror arrangement in FIG. 10 adjusted according to the present invention.

In this way, the micromirror $16_1$ continues to have a slope of 0.5, whereas the micromirror $16_2$ now has, instead of −0.5, a slope of 0. The corresponding modified second pattern 23 for the large elevation 15 is depicted in FIG. 12. Here, the slope of the micromirror $17_1$ is modified from 0.5 to 0, and the slope of the micromirror $17_2$, from 0 to −0.25.

Figure 14:
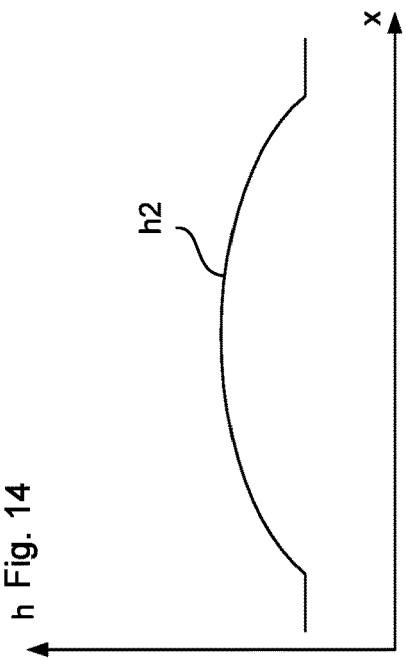
FIG. 14 a height profile corresponding to FIG. 13.
Figure 15:
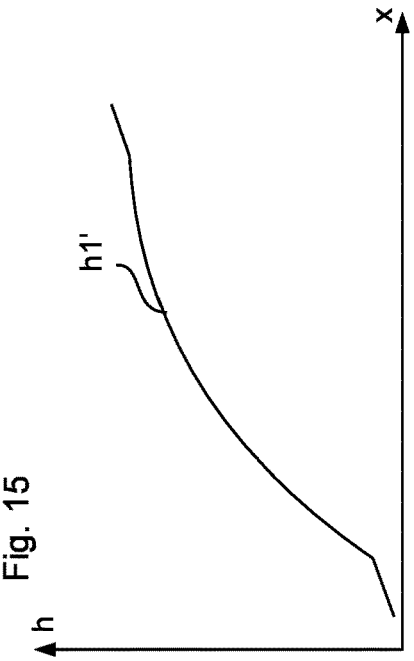
FIG. 15 the change in the height profile effected according to the present invention for the micromirrors of the first areal region.
Figure 16:
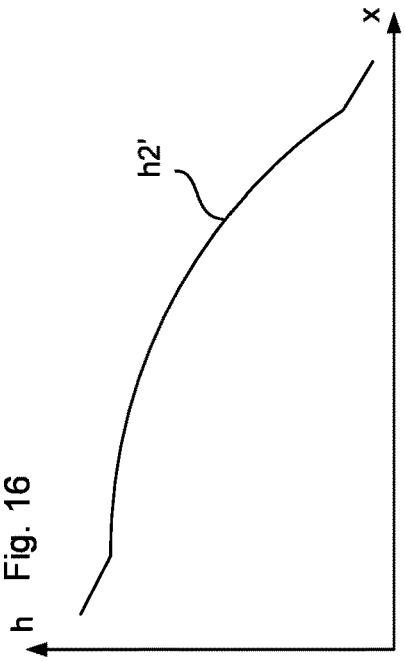
FIG. 16 the change in the height profile effected according to the present invention for the micromirrors of the second areal region.

The slope S1 is thus always between 0 and 0.5, which, for vertical light incidence, leads to a first angle range $\alpha 1$ of 0° to about +53° (for a counterclockwise rotation direction), and the slope S2 is thus always between −0.5 and 0, which, for vertical light incidence, leads to a second angle range $\alpha 2$ of 0° to about −53°. That actually corresponds to the reproduction of modified height profiles h1' and h2', which are shown in FIGS. 15 and 16. A comparison with the original height profiles h1 and h2 shown in FIGS. 13 and 14 shows that the modified first height profile h1' now increases monotonically in the x-direction, while the modified second height profile h2' decreases monotonically in the x-direction.

Figure 3:
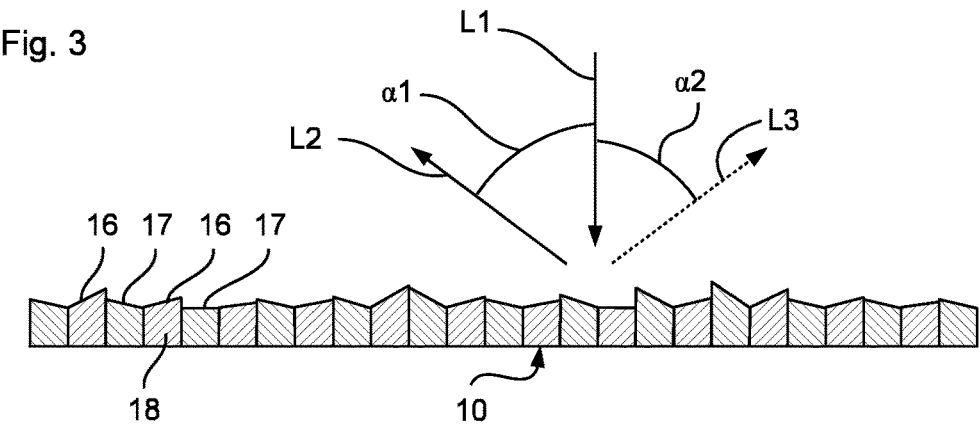
FIG. 3 a sectional view of the optically variable areal pattern 10 having micromirrors 16, 17 for producing the views according to FIG. 2.
Figure 13:
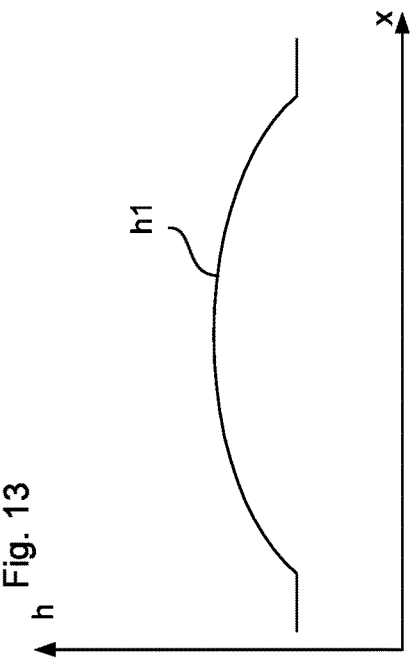
FIG. 13 a height profile corresponding to FIG. 9.

In FIG. 13, to simplify the illustration and for improved comparability, only the height profile of a single elevation is depicted. The associated micromirrors 16 and 17 thus reflect, for example, light L1 incident from above, as depicted in FIGS. 2 and 3, in different solid angle ranges $\alpha 1$ and $\alpha 2$. The micromirrors 16 always reflect the light in the left solid angle range $\alpha 1$, while the micromirrors 17 always reflect the light in the right solid angle range $\alpha 2$.

Figure 17:
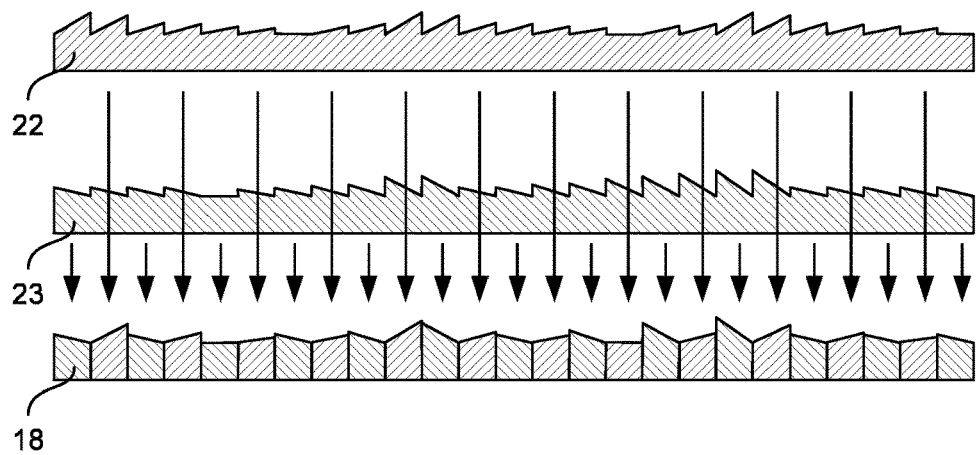
FIG. 17 a diagram of sectional views to explain the inventive pattern proceeding from the modified patterns 22 and 23.

If the micromirrors of the modified patterns 22 and 23 are now nested together, as is indicated in FIG. 17, to arrive at the patterned lacquer layer 18 (which is already depicted in FIG. 3), a very surprising effect occurs. The viewer now no longer sees, from most viewing situations, a superimposition of two different height profiles or bulged-appearing depictions, but, depending on the viewing-angle, usually only one of the two bulged-appearing depictions or views.

The explanation lies in the fact that the viewer perceives, in each case, only the depiction or view that reflects the largest portion of the ambient light and thus appears significantly brighter. The respective other depiction is often so strongly outshone by this that a viewer hardly perceives it any longer, or no longer perceives it at all. If one assumes that the micromirrors 16 and 17 are illuminated vertically from above, as is shown in FIG. 3, then a viewer sees, when viewing from the left, exclusively those facets or micromirrors lighting up that reflect the incident light L1 also to the left, which, in the described exemplary embodiment, is the case only for the facets or micromirrors 16 having slopes S1. Conversely, when viewing from the right, the viewer sees only facets or micromirrors having slopes S2 lighting up brightly, while all facets having slope S1 are dark from this side. So, viewed from the left, the height profile h1', and thus the bulged-appearing small elevations 14, results for a viewer, while from the right, the viewer sees the height profile h2' and thus the large elevation 15. The viewer thus sees different depictions from left and right, each of which appear bulged.

What is surprising is that, in practice, it attracts practically no attention that the height profile h1' increases in the x-direction here, while the height profile h2' decreases in said direction. Human perception is apparently geared toward perceiving changes in slope corresponding to a curvature or bulge, while the absolute slope is difficult to perceive. For the viewer, the bulged views thus seem to have the height profile h1 or h2.

Let it be noted that the same effect as for viewings from different positions can also be achieved by tilting the inventive areal pattern 10. It is thus also possible to say that the optically variable areal pattern 10 provides a tilt image having a bulge effect. In practice, a tilting of the areal pattern 10 is also the far more common case. A viewer tilts an areal pattern 10 according to the present invention about a specified axis and observes how a bulged-appearing first depiction changes into a potentially completely different second depiction that likewise again appears bulged. The effect realized according to the present invention is striking for a viewer in many respects, and is thus particularly memorable. The reproduction of a macroscopic bulge with microscopically small facets as known in the background art is already striking, especially if a viewer, contrary to expectation, then cannot palpate with the fingers, on a thin foil without perceptible elevations and depressions, the bulge suspected by the eye. The fact that such a depiction then changes, for example by tilting, into another, likewise bulged-appearing depiction, is likewise contrary to the usual expectation. Moreover, with respect to the background art, said tilt effect also increases the security against counterfeits or imitations, since it is not imitatable with typographic means.

The height profiles of the individual depictions are advantageously considerably more complex than the simple elevations 14 and 15 depicted here. The first depiction can show, for example, a bulged-appearing value numeral, while the second depiction can show, for example, a symbol or a crest. Furthermore, it is possible that one or both depictions also show a bulged-appearing portrait, geographical maps, lettering and/or other bulged-appearing depictions. Portraits are particularly advantageous since, on the one hand, they show very complex depictions and are thus extremely difficult to reproduce, while on the other hand, however, they can be very easily perceived and verified by the human viewer.

The situation depicted here for the height function $h=h(x)$ can easily be transferred by the person of skill in the art to the general case $h=h(x, y)$.

The bulged-appearing views are advantageously realized through an optically effective relief pattern that can be cast in an embossing lacquer 18 and preferably provided with a reflective or reflection-increasing coating. Especially also color-shifting coatings, for example thin-film interference coatings having an absorber/dielectric/reflector, or coatings having cholesteric liquid crystals, are advantageous. The development of the optically changing relief pattern having reflective facets was already described in connection with FIGS. 1 to 17. Here, it was assumed that a micromirror 16 and 17 of the patterns 22, 23 that are nested within each other is always arranged in alternation. However, it is also possible to provide, instead of the individual micromirrors 16, 17, multiple micro-mirrors having especially the same slope in order to realize a reflective facet. In this way, the reflective facets as in WO 2011/066990 A2 can be realized. Advantageous dimensions of facet patterns are between 2 µm and 300 µm, preferably between 3 µm and 100 µm, and particularly preferably approximately between 6 µm and 20 µm.

However, it is also possible that the optically effective relief patterns are realized through such patterns that can also be referred to as Fresnel patterns, as are described in EP 1 562 758 B1.

The Fresnel patterns advantageously have a height of under 300 µm. Particularly advantageous are very small heights of less than 10 µm or even less than 5 µm.

Furthermore, especially asymmetric relief patterns are advantageous, for example having regular or irregular sawtooth profiles. But the effect according to the present invention is realizable also with symmetric patterns such as diffractive hologram gratings (if with restrictions). Depending on the execution, the optical effect of the relief patterns can be of a substantially ray-optical or diffraction optical nature.

Instead of relief patterns, the optical effect according to the present invention can also be realized, for example, in a volume hologram, an areal pattern 10 having an optically effective relief pattern 18 according to the present invention being able to serve as the master for exposure.

The different solid angle ranges $\alpha 1$, $\alpha 2$ from which the at least two different, bulged-appearing depictions are visible can overlap, touch or be spaced apart from each other.

If they overlap, from one angle range, the first, from another angle range, the second, and from a third angle range, both depictions are visible. If they touch, then both depictions are visible practically only from different directions, the spread of the light source being able to lead to both depictions also being visible simultaneously in certain angle ranges. If they are spaced apart from each other, the solid angle range in which both depictions are visible simultaneously can be minimized. For example, the slope in the above-mentioned example for h1 can be in the range between −1.2 and −0.2, and for h2, between 0.2 and 1.2.

The solid angle ranges or the ranges of the slopes of the different depictions need not be symmetrical. Thus, for example, the slopes for the height profile h1 can be between −0.2 and 0.2, and for the height profile h2, between 0.5 and 0.9. An asymmetric arrangement can be advantageous especially when the light source, under the usual viewing situations, is not located in the mirror reflection of the substrate. In further embodiments having more than two different depictions, the solid angle ranges can be chosen such that the viewer must rotate the areal pattern according to the present invention only about one or about two axes to be able to see the different depictions.

The bulged-appearing depictions in the present sense thus imitate a bulge by reproducing the reflection behavior of a bulged surface. They thus include practically only information about the local slope of the reproduced surface, and no absolute depth information, as is present, for example, in a stereogram. What distinguishes the bulged-appearing depiction is especially that flares, for example when the areal pattern 10 according to the present invention is tilted, wander around as on a metallic relief. Such a depiction is thus similar to a macroscopic embossing, as they are known, for example from coins. Tilt images known in the background art, for example corresponding embossed holograms having different, viewing-angle-dependent motifs, do not display said properties. Also the stereographic depictions having a 3D effect known in the background art can indeed display bulged objects, but do not have the property that flares wander on the depicted objects as on a metallic embossing. Stereographic depictions or tilt images in which the impression of a bulge is produced merely by static shadings or similar, just as a good painter can also lend his paintings a certain plasticity through skillful choice of color, are not bulged-appearing depictions in the sense understood here.

The solid angle range in which one of the at least two different depictions is visible also determines the associated region of slopes S that can be reproduced to imitate the reflection behavior of a bulged surface. The larger the viewing angle range, the larger slope differences can be reproduced and the more pronounced and high-contrast the bulge appears. This, while it is, in principle, possible to nest also more than only two bulged-appearing depictions within each other, with an increasing number of different depictions for each individual depiction, there is an ever smaller solid angle range available, such that the depictions become flatter and lower-contrast. Thus, for an effective bulge effect, slope differences are preferred that correspond to an angle range of the reflection directions of at least 10°, preferably at least 20° and particularly preferably over 30°.

In special embodiment variants, for the optically variable areal pattern 10 according to the present invention, advantageously a combination having a known unchanging bulge effect can be provided. Thus especially also only individual elements of a bulged-appearing depiction can be viewing-angle dependent. For example, on a bulged-appearing clock, a bulged-appearing hand could move viewing-angle dependently to another position, or a bulged-appearing person could, for example, raise its hand or turn its head when tilted.

In special embodiments, it can be advantageous to expand the viewing angle range belonging to one of the bulged-appearing views differently in different directions. If, for example, two bulged depictions are given by height functions $h_A(x, y)$ and $h_B(x, y)$, and if it is assumed that the associated slopes $S_{Ax}$, $S_{Ay}$, $S_{Bx}$ and $S_{By}$ in the x- or y-direction were originally between −0.5 and +0.5, then, for example, analogously to the above approach, according to the following transformation of the slopes, the viewing angle ranges can be separated in the y-direction, and simultaneously the slopes left unchanged in the x-direction:

$$S2_{Ay}=0.25+S_{Ay}/2$$

$$S2_{Ax}=S_{Ax}$$

$$S2_{By}=-0.25+S_{By}/2$$

$$S2_{Bx}=S_{Bx}.$$

The depictions are thus somewhat flatter in the y-direction, but in the x-direction, continue to take full advantage of the specified range of the slopes and thus appear to be higher-contrast than if the slopes in the x-direction were to likewise be scaled down by a factor of 2. Actually, this results in a distortion of the reproduced height profiles, which, however, is surprisingly not perceived by the viewer.

If one extends this example to not only two but very many views, then the individual views always include fewer slope differences in the y-direction and, ultimately, almost exclusively slopes in the x-direction. But these, too, continue to be perceived by the viewer as bulged, and it has become evident that it is possible to realize even cinematic effects that continue to give the impression of a bulge.

Figure 18:
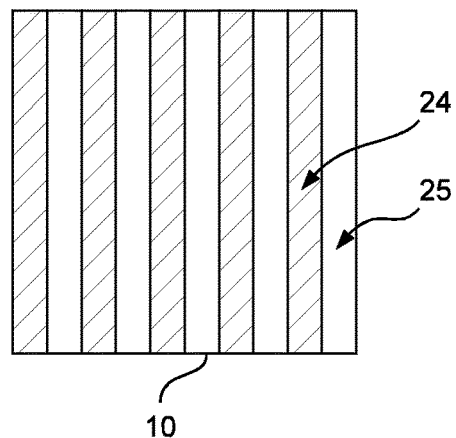
FIG. 18 a schematic top view of the optically variable areal pattern 10 to explain one possibility for the nesting of the two areal regions 24 and 25, and FIG. 19 a further schematic top view of the optically variable areal pattern 10 to explain a further variant of the nesting of the two areal regions 24 and 25.
Figure 19:
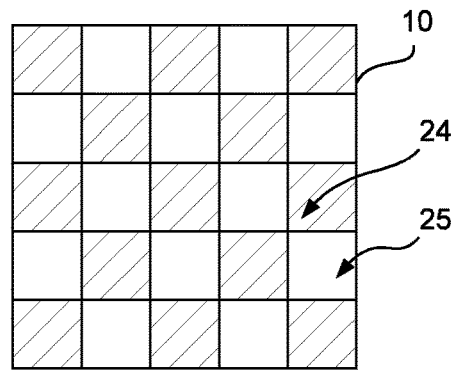

The nesting of the at least two depictions can occur largely arbitrarily. The surface of an areal pattern according to the present invention can, for example, be divided into individual strips (FIG. 18) or pixels (FIG. 19) that reflect incident light alternatingly according to the reproduced bulge of the associated depiction. In the nestings shown in top view in FIGS. 18 and 19, the strips or squares depicted in crosshatching can comprise the micromirrors 16, and the strips or squares not depicted in crosshatching can comprise the micromirrors 17. The crosshatched strips or squares together form a first areal region 24, and the non-crosshatched strips or squares together form a second areal region 25.

Advantageously, the nesting is chosen such that it is not resolvable with the naked eye. For this, the dimension of the associated sections (for example strips, squares, etc.) of the areal regions 24, 25 should, at least in one direction, be as small as possible, for example less than 100 µm or even less than 50 µm. The strips or pixels can all be the same size or have different sizes. The pixels can be arranged regularly (for example hexagonal, rectangular or especially quadratic pixels on a regular grid) or also be arranged irregularly and have identical or different shapes. The areal fractions of the individual depictions can all be identical or different. For a different split, one of the depictions can, for example, appear brighter and higher-contrast than others.

The optically variable areal pattern 10 according to the present invention can especially be provided in the form of foil-based security elements for banknotes. Here, embodiments as a security strip, patch or especially also as a window thread 12 (FIG. 1) are possible.

The optically variable areal pattern 10 according to the present invention can advantageously be combined with other security features, such as fluorescent inks, plaintext, for example produced by an only partially present reflective or at least reflection-increasing coating, magnetic or polarization effects, or other optically variable security features such as holograms, etc.

LIST OF REFERENCE SIGNS

10 Optically variable areal pattern
11 Banknote
12 Window thread
13 Rectangular areal region
14 Small elevation
15 Large elevation
16 Micromirror
17 Micromirror
18 Lacquer layer
19 First pattern
20 Second pattern
21 Third pattern
22 Modified first pattern
23 Modified second pattern
24 First areal region
25 Second areal region
L1 Incident light
L2 Reflected light of the first view
L3 Reflected light of the second view
α1 First solid angle range
α2 Second solid angle range
h1 Height profile
h2 Height profile
h1' Height profile
h2' Height profile

The invention claimed is:

1. An optically variable areal pattern comprising:
a substrate that comprises a first and a second areal region, the two areal regions being developed in such a way that the first areal region presents, in a first viewing angle range, a bulged-appearing first depiction, and the second areal region presents, in a second viewing angle range that is different from the first viewing angle range, a bulged-appearing second depiction,
wherein the first and the second areal regions are nested within each other,
wherein over at least a part of the first viewing angle range only the bulged-appearing first depiction is perceptible and over at least a part of the second viewing angle range only the bulged-appearing second depiction is perceptible, and
wherein at least one of the two areal regions present the bulged-appearing depiction by imitating the reflective behavior of a bulged surface, in which the imitation of the reflection behavior of the bulged surface is effected by optically effective relief patterns, in which each of the relief patterns reconstruct, for each depiction, local changes in slope of the respective depiction to be presented, in which the local changes in slope reproduced by the relief patterns are executed such that incident parallel light is reflected in the corresponding viewing angle range.

2. The optically variable areal pattern according to claim 1, in which the two areal regions are developed as reflective areal regions.

3. The optically variable areal pattern according to claim 1, in which the optically effective relief patterns are developed in a lacquer layer.

4. The optically variable areal pattern according to claim 1, in which the optically effective relief patterns are provided with a reflective or at least reflection-increasing coating.

5. The optically variable areal pattern according to claim 1, in which the optically effective relief patterns comprise micromirrors.

6. The optically variable areal pattern according to claim 5, in which the micromirrors comprise dimensions between 2 μm and 300 μm.

7. The optically variable areal pattern according to claim 1, in which the optically effective relief patterns comprise diffraction-optically effective diffraction patterns.

8. The optically variable areal pattern according to claim 1, in which the two viewing angle ranges do not overlap.

9. The optically variable areal pattern according to claim 1, in which the first and/or second areal region reflect/reflects incident parallel light in an angle range of at least 10°.

10. A security element having an optically variable areal pattern according to claim 1.

11. A value document having an optically variable areal pattern according to claim 1.

12. A method for producing an optically variable areal pattern comprising:
  a substrate that comprises a first and a second areal region, the two areal regions being developed in such a way that the first areal region presents, in a first viewing angle range, a bulged-appearing first depiction, and the second areal region presents, in a second viewing angle range that is different from the first viewing angle range, a bulged-appearing second depiction, the first and the second areal regions being nested within each other, such that over at least a part of the first viewing angle range only the bulged-appearing first depiction is perceptible and over at least a part of the second viewing angle range only the bulged-appearing second depiction is perceptible, and
  wherein at least one of the two areal regions present the bulged-appearing depiction by imitating the reflective behavior of a bulged surface, in which the imitation of the reflection behavior of the bulged surface is effected by optically effective relief patterns, in which each of the relief patterns reconstruct, for each depiction, local changes in slope of the respective depiction to be presented, in which the local changes in slope reproduced by the relief patterns are executed such that incident parallel light is reflected in the corresponding viewing angle range, wherein:
  the slope profiles of the depictions to be presented are determined,
  the slope profile of the first depiction and the slope profile of the second depiction are modified via different transformations, and
  the substrate having the two areal regions is manufactured based on the modified slope profiles.

\* \* \* \* \*